United States Patent

[11] 3,564,150

[72] Inventor Jean Jacques Muller
Garches, France

[21] Appl. No. 737,963
[22] Filed June 18, 1968
[45] Patented Feb. 16, 1971

[73] Assignee International Standard Electric Corp.
New York, N.Y.

[54] MOBILE RADIO TELEPHONE AND PAGING SYSTEM
10 Claims, 5 Drawing Figs.

[52] U.S. Cl. ........ 179/41
[51] Int. Cl. ........ H04b 3/60
[50] Field of Search ........ 179/41 (A)

[56] References Cited

UNITED STATES PATENTS

| | | | |
|---|---|---|---|
| 2,629,092 | 2/1953 | Herrick ........ | 179/41 |
| 3,140,468 | 7/1964 | Blaisdell et al. ........ | 340/171 |

FOREIGN PATENTS

| | | | |
|---|---|---|---|
| 696,503 | 9/1953 | Great Britain ........ | 179/41 |

*Primary Examiner*—Kathleen H. Claffy
*Assistant Examiner*—Douglas W. Olms
*Attorneys*—C. Cornell Remsen, Jr., Rayson P. Morris, Percy P. Lantzy, J. Warren Whitesel and Delbert P. Warner

ABSTRACT: A public mobile radio communication system is provided for a plurality of mobile radio stations in which each mobile station includes either paging devices, or a telephone, or both. The system employs a service radio channel for sending selective calls from a fixed station to terminate at all the mobile stations. A second radio channel is marked by the fixed station for signaling from the mobile stations having telephones and the capacity to originate calls. Communication between the fixed station and a mobile telephone will employ either the second marked channel or another differently marked free channel.

J. J. MULLER
Inventor
By D. G. Warner
Attorney

MOBILE RADIO TELEPHONE AND PAGING SYSTEM

The present invention relates to systems of mobile radio communications which allow a fixed station to communicate with apparatus mounted on vehicles.

Radio telephone links are thus utilized between a fixed station and mobile radio telephone sets, on a group of channels used according to the rules of each system. The mobile sets each assume a watching condition on a channel designated according to the rules. To serve terminating calls, i.e., calls received by mobile stations, the fixed station sends selective calls on this channel to the wanted mobile stations. For originating calls, the calling mobile sets send their call signals on a free channel designated according to the rules of the system. After the call, conversation is established on a free channel which is also designated according to the rules of the system. Calls comprise an exchange of signals which can last 2 or 3 seconds. Conversations last, on an average, 1 or 2 minutes.

In a known system, there is provided a fixed service channel for all calls; conversations, however, are distributed over the other channels according to some rule of rotating priority. The fixed station chooses a free channel according to the rule of the system and designates it by marking it with a tone. After a call on the service channel, the fixed station and the mobile set turn to the designated channel, for the conversation, and the fixed station designates another free channel to receive the following communication.

This known system has the advantage that the mobile sets remain always in a state of watchfulness on a fixed channel, and change channel only for their own conversations. However, in practice, the channels are not numerous including perhaps ten or fewer channels. The call traffic can be 30 or 40 times less than the conversation traffic, which means that the traffic on the service channel can be three or four times, or even 10 times less than on the conversation channels. This channel is poorly utilized.

In another known system, all the traffic is distributed on all the channels. The fixed station designates a free channel, every call both terminating and originating, is sent on this channel, and conversation takes place on this same channel. As soon as this channel is taken by a call, the fixed station designates another free channel with a view to the following call. This system balances the traffic on all the channels. However, each time that a designated channel is taken by any call whatever, all the other mobile sets which were watching on this channel ought to change channel in order to be tuned on the newly designated channel. That only requires a small supplementary equipment in the mobile sets which are, anyhow, provided with an automatic channel search device, but it is clear that it is preferable that all the mobile sets may not have to change channel each time that the guard channel is taken by one of them.

In another known system, the fixed station designates two free channels, one for originating calls and the other for terminating calls. All the mobile stations in a state of watch are tuned on the terminating channel. On a terminating call, the called set takes the terminating channel, and the fixed station designates another terminating channel for the following terminating communication. Conversation is established on the channel taken for the call. For an originating call, the calling set leaves the terminating channel and turns to the originating channel. It takes this channel, and the fixed station designates another originating channel for the following originating communication. Conversation is established then on the channel taken during the call. Thus, the sets which are watching on the terminating channel change channel when terminating call occurs, but they remain on the same channel when an originating call occurs. As terminating calls are much less numerous than originating calls (for example 10 times less numerous), sets in a state of watch ought to change channel much less often than in the system with one channel.

In another known system, the fixed station marks all the free channels and sends terminating calls on all of them. Originating calls can take any free channel whatever. In this system, the sets which are watching on one channel can remain on that channel so long as that channel has not been taken by a call. However, this system requires permanent transmission on all free channels. Besides, all call distribution is random, instead of being methodically ensured by a turning priority device.

There have been enumerated above several systems of radiotelephone communication for mobile radiotelephone sets. There exists, on the other hand, another kind of radio link which is limited to sending selective calls to simple mobile call warners or paging devices. The warner which is reached by a selective call generates simply a local signal which warns the user of this apparatus that he ought to take a step agreed to in advance. For example, the user ought to telephone to his house or to his office, etc. These warners or paging systems do not include a radio transmitter and cannot send an answer to the fixed station. Obviously, the structure of such warners should be very simple, and in the present state of the art, it would be undesirable to complicate it with an automatic channel search device. In practice, this kind of link should be carried out on a fixed call channel.

An object of the present invention is to combine these two kinds of links, that is to say, the radiotelephone communication with mobile sets and calls to simple mobile call warners, or paging devices. The invention has also as an object to avoid automatic changes of channel in the mobile sets in a watch condition, and above all in the call warners, and not to keep a channel for traffic which would busy it much less than the other channels.

According to the present invention, there is provided a system of combined communication in which a fixed service channel is allotted to the selective calls, i.e., calls coded to be received by a particular telephone, in all terminating calls i.e., calls received by a telephone, addressed either to mobile sets or to the call warners. The sets in a state of watch are tuned on this channel and the warners are adjusted on this channel by construction. However, a distinctive marking is applied by the fixed station to some free channels to allow the seizure of a channel by an originating call from a mobile set and also for the communication (continuation of signalling and conversation) in a terminating call. Thus the service channel is suitably busied by calls without answer, and these calls dispose almost entirely of this channel, for the traffic of selective calls towards the mobile sets is very small. At the same time, the mobile apparatus of the two kinds have not to change channel in their state of watch.

The eventuality of simultaneous calls poses the technical problem of avoiding confusion between these calls, when the stations which make an originating call or which are reached by a terminating call have not to change channel for the following communication. It is known to reduce the probability of this confusion to a very small amount by means of a "red lamp" device. In this device, the immediate effect of the picking up of the handset in an originating call, is to send a signal to the fixed station, which answers by immediately suppressing the marking on the channel which has been seized. This marking is also suppressed by the fixed station as soon as it sends out a terminating call. In this case, the red lamp prevents other stations from making an originating call, while the current call remains unfinished, and the set has not turned to another channel marked free. However, the use of this device is not possible in the system of combined communication according to the invention for the red lamp would be lit for each call intended for a warner, which would prevent outgoing calls in an inadmissible manner.

The system according to the invention provides, preferably, apart from the service channel, two free channels distinctively marked, one for originating calls (with communication on the same channel) and the other for terminating communications following their selective calls (following signalling and communication). This system completely avoids interferences between a terminating call and originating calls. As for interferences between originating calls, since a calling set ought first to change channel, to turn from the service channel on which it was in watch position to the designated originating channel, the probability of confusion is limited to the very brief time during which the fixed station seized by the seizure signal of the first originating call has not yet suppressed the originating marking on the channel taken, to transfer it then to another free channel. That is to say, that this probability is limited to the same delay, very short, as the delay of operation of a red lamp device. This system has then no need to provide such devices in order to operate as well as if it used them.

The invention provides however a modification which provides, apart from the service channel, a single channel marked free. A mobile set which is reached by a selective call, as well as a set where the handset is lifted for an originating call, leaves the service channel in order to be tuned on this marked channel, and sends thereon a seizure signal to which the fixed station answers by suppressing the marking on this channel to transfer it to another free channel. This system does not avoid interferences completely between a terminating call and originating calls, but it limits the probability of all interferences to the short delay defined above. In other words, in this variant the probability of interferences is still limited as well as with red lamp devices.

Another object of the invention is to limit the expenditure of power due to permanent transmissions on the marked channels. The fixed service channel is known not to need to be marked; the sets in a state of watch can be tuned on this channel by construction. In the modification with one communication channel, this single channel must be permanently marked. According to a characteristic of the invention, in the system with two communication channels, only the free channel designated for originating calls is permanently marked, while the communication channel designated for a terminating call is marked only from the transmission of a selective call seeking a mobile set. Preferably, this terminating channel is no longer designated in advance, but only for each terminating call seeking a mobile set. This device ensures priority to originating calls when it is a question of allotting the last free channel.

The invention relates also to fixed stations and telephone exchanges associated with these fixed stations, equipped in such a way as to satisfy the characteristics defined above. In particular, according to a characteristic of the invention, the registers of the associated exchange discriminate between three kinds of terminating calls (according to the prefix of the wanted number), that is to say, (1) ordinary telephone calls, (2) calls intended for mobile radiotelephone sets and (3) calls without answer intended for call warners. These latter are serviced by establishing a service connection between the register and the fixed service channel to send the selective call on this channel, after which the incoming communication is released. Calls intended for mobile sets are serviced by first checking the possibility of establishing a radiotelephone connection (especially, by testing the availability of the wanted set in a line circuit allotted to this set, and by searching for a free channel).

The invention will be described more particularly with reference to the accompanying drawings, which show embodiment examples in which.

Figure 1:
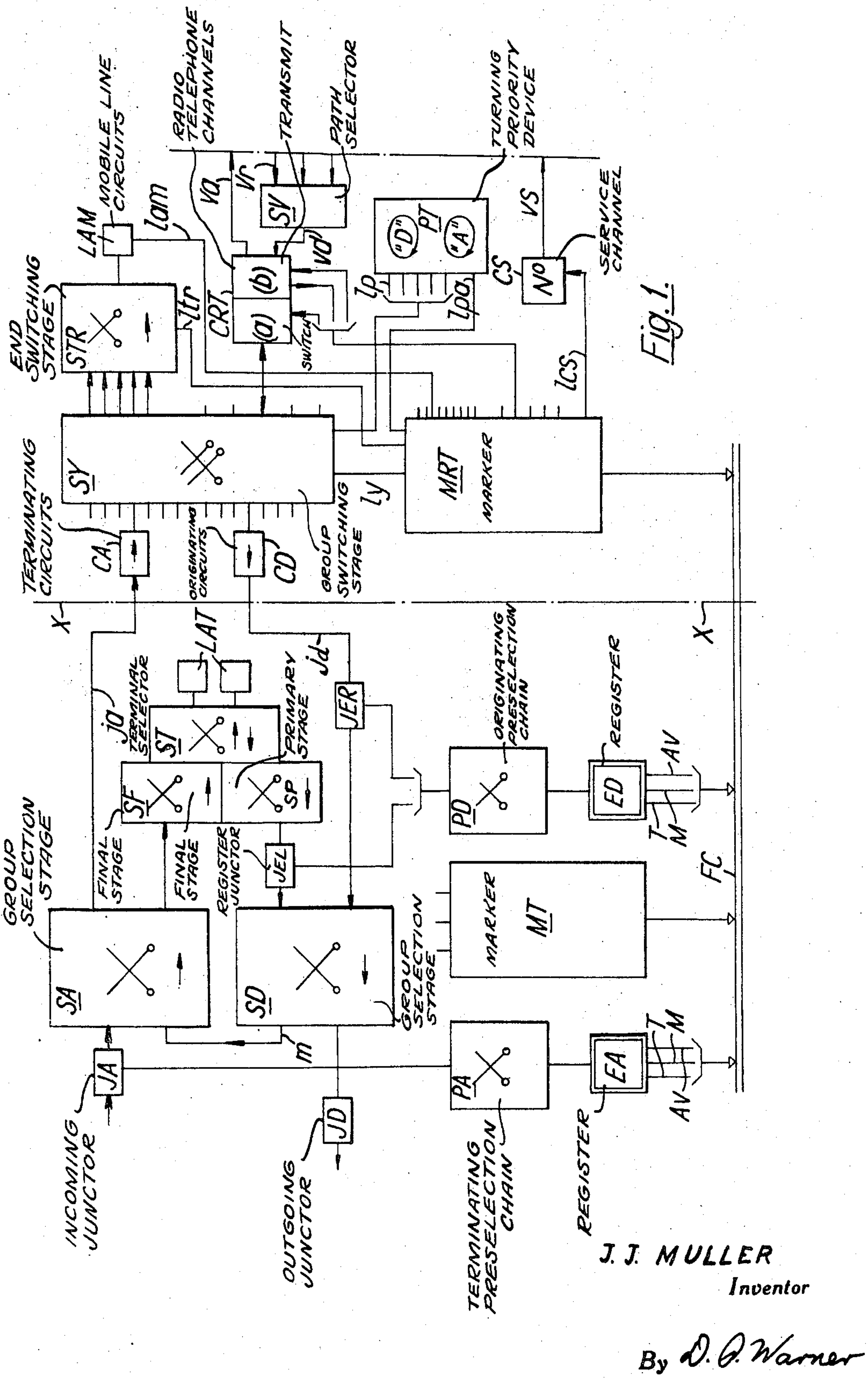
FIG. 1 is a junction diagram of a telephone and radiotelephone exchange according to the invention.

In the embodiment example shown, the telephone and radiotelephone exchange is like that which has been described in the French patent application filed on the 12th of Apr. 1967, for "Improvements in automatic mobile radiotelephone networks," in the same name as the present. It comprises, however, some new elements intended for the service of calls without answer according to the present invention.

There will first be described briefly the constitution and operation of this exchange. The line circuits of local subscribers, LAT, are carried by a terminal selector stage ST, which is two directional. For originating calls this stage is connected to a primary stage SP the outputs of which carry register junctors JEL. For an originating call, these junctors are connected to originating registers ED by an originating preselection chain PD. The register analyses the wanted number, and if it concerns a telephone call, it sends connection information to a telephone marker MT, passing through the usual connection bundle FC. This information is represented by the line T outgoing from the register. The junctors JEL are carried by the inputs of an originating group selection stage SD. This stage is connected in its turn to a terminating group selection stage SA, by links such as *m*. Other outputs of the originating stage SD carry outgoing junctors JD towards other exchanges, and other inputs of the terminating stage SA carry incoming junctors JA coming from other exchanges. The outputs of the stage SA are connected to a final group stage SF which is connected to the terminal stage ST. If the call is local, the marker MT will establish the connection LAT-SP-JEL-SD-SA-SF-ST-LAT′. If the call requires a distant station the marker MT will establish the connection LAT-ST-SP-JEL-SD-JD towards the distant exchange.

For a terminating call, the junctors JA are connected to terminating registers EA by a terminating chain of preselection PA. The register analyses the wanted number (sent by the distant exchange) and if it concerns a telephone call, it sends the connection information to the marker MT passing through the connecting bundle FC. This information is again represented by the line T of register EA. The marker MT establishes the connection from the distant exchange JA-SA-SF-ST-LAT′.

There will now be described the radiotelephone device associated with this exchange. This device is shown to the right of the line X–X. According to the patent application above cited, this device comprises a number of originating circuits CD and terminating circuits CA. The originating circuits are connected to inputs of originating group selection stage SD, by trunks *jd* and going through junctors JER like the local registers junctors JEL. The terminating circuits are connected to outputs of the terminating group selection stage SA, by trunks *ja*. When there is an originating radiotelephone call asking for a fixed station, the junctor JER takes a register ED, which operates as stated above. When there is an originating radiotelephone call which asks for a mobile station, the register which analyses the wanted number (originating register ED or terminating register EA, according to the case) sends connection information represented by the line M to the marker MT. The marker connects the calling junctor to a trunk *ja*, or a junctor JEL or JER, by stages SD and SA, or a junctor JA by the stage SA.

The circuits CD and CA are carried by terminals, single side, of a group switching stage in a Y-shape, SY. In this switching stage, the crosspoints each time establish a connection between a terminal on the single side (to the left in the drawing) and two terminals on the double side (to the right in the drawing). Details of such a stage are described in the patent application cited above. A series of terminals, on the double side, is connected to the corresponding terminals of an end switching stage STR which carries on the other side, the line circuits LAM of the mobile subscriber stations. The other series of terminals, double side, is connected to radiotelephone channels CRT which each comprises a switching equipment (*a*) in connection with the stage equipment SY, and a transmission equipment (*b*) which comprises essentially a signaller and a 2-wire-4-wire coupler connected to the incoming path *vd* and the outgoing path *va* of a duplex radiotelephone channel. It is supposed that the reception is carried out by space diversity, and the drawing shows three reception paths *vr* which are led to a path selector SV. This selector chooses the path which gives the best reception and connects it to the path *vd*.

In the system according to the invention there is provided a fixed service channel for sending the numbers wanted in terminating calls. This channel comprises only one transmission path *vs* associated with a service channel CS which is only capable of sending numbers in the usual radiotelephone form. The channel CS will also be used to call the call warners (paging units) or to call the mobile sets (calls intended for the paging units, or warners, or calls without answer, should furnish the greater part of the traffic on this channel, and the calls intended for mobile sets, a small part of this traffic). Two systems are envisaged for the remainder of the traffic. In the preferred system, one of the channels CRT is marked with a tone D; it will be engaged by a mobile set for an originating call and the communication which will follow this call. This marking D will be sent permanently on one of the free channels. Another free channel will be marked with a tone A with a view to the communication which should follow a terminating call. This marking A can be sent only each time there will be a terminating call, and stopped as soon as the mobile set will have found the channel thus marked. In a modification of this system, one only of the channels is marked with a tone G; it will be engaged, as well for an originating call and communication as for a terminating communication after the sending of the called number on the service channel. This marking G will evidently be a lasting marking on one of the free channels.

The methodical selection of the free channels to be marked is carried out by means of a turning priority device PT. On the drawing this device is shown with two priority rings, for the preferred system with two marked channels. This device is connected to all the channels by connections *lp* which allow of the state of occupation of channels to be known and the channels to be marked designated. It is supposed here that these connections are connected, in the stage SY, to the equipments which are associated with the circuits CRT. Each time that a channel designated by the priority ring D is engaged, this ring seeks another free channel and designates it in order that the marking D may be sent on this channel. The priority ring A operates only in a terminating call towards a mobile set. This ring then searches for a free channel and designates it in order that the marking A may be sent on this channel. If the ring A does not find a free channel, the call will be refused to the caller as for a busy mobile set. The carrying out of these two priority rings is in the domain of current art. In the modification with one channel G; the device PT evidently comprises only one priority ring, as that is usual.

The operation of the apparatus SY, STR, LAM, CRT, CS and PT is controlled by a radiotelephone marker MRT. In a terminating call intended for a call warner the register ED or EA notes this type of call and sends the wanted number and the indication of this type of call (output AV of the registers) to the marker MRT by the connecting bundle FC. The marker MRT translates the number into the form required for sending and transmits it to the circuit CS, which sends it on the service channel. As the called warner will not send any answer, the connection is released after the sending of the called number.

In a terminating call intended for a mobile set, the register (ED or EA) sends first the wanted number, and the indication of this type of call (output M of the registers) to the marker MRT by the connecting bundle FC. The marker reaches the line circuit LAM of the wanted set by a decoder not shown and separate connections such as *lam*. If this circuit is in the "-free" state, the marker, by a connection *lpa*, controls the search for a free channel by the priority ring A in the device PT. If the device PT finds a free channel, it designates it to the equipment SY and signals it to the marker. The marker controls by the circuit CRT (*b*) of this channel the marking of this channel with the tone A and controls by the circuit CS (through the connection lcs) the sending of the wanted number on the service channel. Lastly, the marker controls the stage STR, by the connection *ltr*, to connect the line circuit LAM to the link towards the stage SY which corresponds to the designated channel; and it controls the stage SY, by the connection *ly*, to connect this link, at the same time as the link coming from the circuit CRT of the same channel to a free circuit CA. The exchange of signals (Including the stoppage of the marking A) which follows the selective call of the mobile set is done by means of the circuit CRT (*b*) and the marker MRT. On the other hand, the register informs the telephone marker MT which controls the connection with the circuit CA as stated above.

If the line LAM is in the "busy" state, or else if the priority device PT does not find a free channel, the register sends a busy tone to the caller. If the marker MRT does not find a line circuit LAM which carries the wanted number, the register can pass the call to an operator, as described in the patent application above cited.

In an originating call (on the channel marked D), the circuit CRT CA. b) sends the identity code of the calling station to the marker MRT. The marker seizes the corresponding line circuit, which should be in the "free" state. The marker then controls, as in a MRT. call, a double connection through the stage SY, with the calling channel and with the line circuit of CA calling set but this time with an originating circuit CD. This circuit is connected to its junctor JER, which engages an originating register ED by the preselection stage PD. The register sends to the calling set the dialling tone, and the set sends the wanted number. The register stores this number, analyses it and sends the corresponding information to the marker MT (or to the marker MRT if the mobile calls another mobile or a call warner). The connection with the line circuit LAM allows of the communication being metered on a meter connected in this circuit.

If the marker MRT does not find a line circuit which corresponds to the identity code sent by the mobile, it can again pass the call of this mobile to an operator.

The signalling which precedes and which follows the sending of the identity code in an originating call is again carried out by means of the circuit CRT (*b*) and the marker MRT. The details of this signalling are in the domain of current art. As to the program of the signals exchanged, it will be described later.

The transmission and reception apparatus associated with the exchange described above are shown in FIG. 2. Each channel of communication is served by a transmitter EC and by several spaced receivers RC (three in the drawing). The service channel is served by a transmitter ES.

Figures 2, 3, 4, 5:
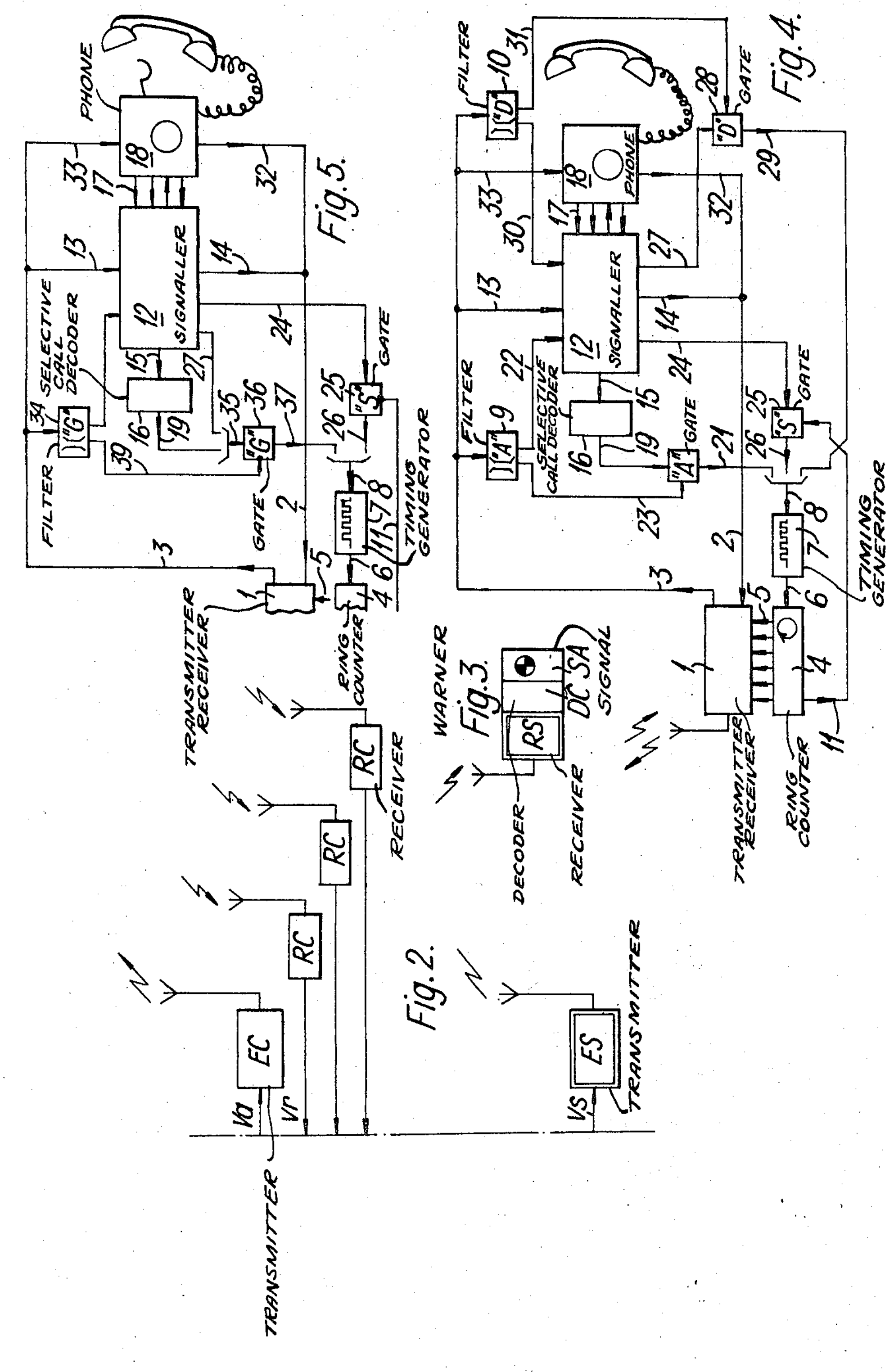
FIG. 2 shows the radiotelephone transmitters and receivers associated with the exchange of FIG. 1.
FIG. 3 shows the essential apparatus of a call warner.
FIG. 4 is a functional schematic of a mobile radiotelephone set according to the invention, in the system with three channels according to the invention and, FIG. 5 is a similar schematic in the modification with two channels according to the invention.

FIG. 3 shows the essential apparatus of a call warner. This warner (which is known apparatus) is composed of a receiver tuned on the fixed service channel, of a selective call decoder DC and of a warning signal SA.

There will now be described the circuits of a mobile set according to the invention intended for the system with three channels, by referring to FIG. 4. The program for the exchange of signals in such a set with the fixed station of FIG. 1 is as follows:

| Programme of the fixed station | | Programme of the mobile station |
|---|---|---|
| | Terminating communications | |
| (No. called on service channel (Marking "A" on a free channel) | → | Decoding of selective call Search for channgel "A" End of search |
| | ← | Acknowledgement of receipt $T_1$ |
| Stoppage of marking "A" Connection Ringing | → | Ring Lifting of handset |
| | ← | Signal $T_2$ |
| Connection | | |
| . . . . . . . . . . . . . . . . . . . . . . . | | . . . . . . . . . . . . . . . . . . . . . . . . Hanging up Signal $T_3$ |
| | ← | Homing to the service channel |
| Release | | |
| | Originating communications | |
| | | Lifting of handset Search for channel "D" End of search |
| | ← | Seizure signal $T_1/T_2/T_1$ |
| Stoppage of marking "D" (Marking "D" on another channel) | → | |
| | ← | Identity code on $T_1/T_2$ |
| Return of identity code | → | |
| | ← | Acknowledgement of receipt $T_1$ |
| Switching sending of dialling tone | → | |
| | ← | Wanted number on $T_1/T_2$ |
| Switching connection and metering | | |
| . . . . . . . . . . . . . . . . . . . . . . . | | . . . . . . . . . . . . . . . . . . . . . . . . Hanging up. Signal $T_3$. |
| | ← | Homing to the service channel. |
| Release | | |

The mobile set of FIG. 4 comprises a duplex transmitter-receiver 1 connected to a transmission line 2 and to a reception line 3. This transmitter-receiver is tuned on one of the channels by means of a ring counter 4 the outputs 5 of which are connected to respective quartz filters in the transmitter-receiver according to well known technique. The input 6 of the counter 4 is connected to a timing generator 7 which furnishes, for example, 5 impulses per second to leave the transmitter-receiver on each channel about 0.2 seconds during the search for a channel. The timing generator 7 steps when a control signal is applied to its input 8. The position of the transmitter-receiver on a marked channel is stated by filters branched on the reception line 3; filter 9 tuned on marking A and filter 10 tuned on marking D. The position on the service channel, which is fixed, is known by construction; the counter 4 delivers a signal on its output 11 when it is in the position which tunes the transmitter-receiver on the service channel. However, if the service channel ought to be marked by a tone to be searched for by the mobile sets, the tuning of the transmitter-receiver on this channel would be noted by a filter like filters 9 and 10.

The free mobile sets are in a position of watch on the service channel. A signaller 12 is connected between the reception line 3 (input connection 13) and the transmission line 4 (output connection 14). An output 15 of the signaller 12 is connected to a selective call decoder 16. The usual connections 17 connect the signaller 12 to the telephone 18.

The signaller 12 receives all the terminating calls sent on the service channel without giving them any continuation. However, when a terminating call is intended for the set considered, the decoder 16 operates and delivers a signal at its output 19 to an A gating device 20. The output 21 of this device then applies a signal to the timing generator 7, and the counter 4 leaves the service channel and passes from one channel to another.

The fixed station places the marking A on a channel at the same time as it sends the call on the service channel, in such a way that the channel designated for the communication may not be taken by the turning priority device to carry the marking D. When the transmitter-receiver 1 reaches the channel which carries the marking A, the filter 9 receives the tone A and transmits it to the signaller 12 by its output 22 at the same time that it locks the gating device 20 by its output 23. The device 20 suppresses the signal on the output 21 towards the input 8 of the timing generator 7. The timing generator stops and leaves the counter 4 on the channel marked A.

In response to the application of the tone A on the input 22, the signaller 12 sends an acknowledgement of receipt (tone $T_1$) to its output 14 towards the transmission line 2. In response to this signal, the fixed station stops the marking A. In the embodiment example shown, the signaller 12 does not respond to the stoppage of the tone A on the connection 22. The exchange proceeds to the connection and sends the ringing signal. The signaller 12 receives this signal by the receiving line 3 and the connection 13 and transmits it to the telephone 18, which rings or makes a visual signal operate. The user takes his handset from its rest, which the telephone 18 signals to the signaller by the connection 17. The signaller 12 responds to this signal by sending a signal of lifting the handset (tone $T_2$) by the output 14 and the transmission line 2. The fixed station replies to this signal by the usual connection operations (including the stoppage of the ringing). The communication is thus established and conversation takes place. After the conversation, the operations carried out in the exchange in response to the replacement of the handset by the calling user are the operations usual in telephony. In response to the replacement of the handset by the mobile user (signalled by the connection 17), the signaller 12 sends a hangup signal (tone $T_3$) by the output 14 to the transmission line 2. At the same time it puts a signal at its output 24. This output is connected to the input of a gating S device 25 the output 26 of which is connected to the input 8 of the timing generator 7. The device 25 puts a signal on the output 26, which puts the generator 7 in action. The counter 4 leaves the used channel and passes from one channel to the other. When it reaches the service channel, it puts a signal on the output 11. This output is connected to the gating device 25 to lock the output 26 of this device. The signal on the output 26 is thus suppressed, the timing generator 7 and the counter 4 stop, and the set remains in a state of watch on the service channel.

In an originating call, the user of the mobile set lifts his handset. The telephone 18 sends a lifting signal to the signaller 12. The logic of the signaller is such that in response to this signal, it puts a signal on its output 27. This output is connected to the input of a gating device 28. The output 29 of this device is again connected to the input 8 of the timing generator 7. In reply to the signal on the input connection 27, the gating device 28 puts a signal on the output connection 29, which sets going the generator 7 and the counter 4. The transmitter-receiver 1 leaves the service channel and passes from one channel to another. When it reaches the channel which carries the marking D, the filter 10 lets the tone D pass and sends it to the signaller 12 by the connection 30. At the same time, it puts a signal on the connection 31 which goes to a locking input of the gating device 28. This device suppresses the signal on the connection 29, which stops the generator 7 and the counter 4. The transmitter-receiver 1 also stops on the channel marked D.

In reply to the tone D on the connection 30, the signaller 12 sends a seizure signal (tone $T_1$ then tone $T_2$ and again tone $T_1$) on the output 14 and the line 2. In response to the first part of this signal, the fixed station stops the marking D. When the signaller 12 notes the stoppage of the tone D at this moment, that will say that it is indeed the mobile set considered that has seized the channel D. The signaller terminates the seizure signal and then sends its identity code (on tones $T_1$ and $T_2$) by the output 14 and the transmission line 2. In response to this code the fixed station proceeds to the return of this code. The signaller 12 then receives the identity code by the receiving line 3 and the connection 13. It checks that the code returned by the fixed station is indeed its own identity code and then sends the acknowledgement of receipt (tone $T_1$). In response to this acknowledgement of receipt, the exchange proceeds to the preselection switching to connect the calling mobile set to a register. On its side, the signaller connects the telephone to the lines 2 and 3, which is shown on the drawing by the connections 32 and 33. The register sends the dialling tone. The user of the mobile station hears this tone and sets up the wanted number on the telephone dial. The signaller 12 translates this number into its tones $T_1$ and $T_2$ and sends it by the output 14 and the transmission line 2. The exchange terminates the switching operations to reach the wanted subscriber, rings this subscriber and meters the communication on the meter allotted to the calling mobile set. After the conversation, the hanging up by the user of the mobile station acts as stated above, and the transmitter-receiver homes to its position of watch on the service channel.

There will now be described the modification of the mobile station which is intended to operate on two channels in place of three. The program of the mobile set and that of the fixed station are detailed in the table which follows and the schematic of this mobile set is shown in FIG. 5.

The mobile station of FIG. 5 also comprises a duplex transmitter-receiver 1 connected to a transmission line 2 and to a receiving line 3. This transmitter-receiver is tuned on one of the channels by means of a ring counter 4 the outputs 5 of which are connected to the respective quartz filters in the transmitter-receiver. The input 6 of the counter 4 is connected to a timing generator 7 which operates when a control signal is applied at its input 8. The position of the transmitter-receiver on the channel marked G is fixed by the filter 34 branched on the receiver line 3. The position on the fixed service channel is signalled by the counter 4 by a signal that it places in this position on its output 11. Here also, the service channel could carry a marking S, which would be detected by another filter branched on the line 3.

The free mobile stations are in watching position on the service channel. A signaller 12 is connected between the receiving line (input connection 13) and the transmission line 2 (output connection 14). An output 15 of the signaller is connected to a selective call decoder 16. The usual connections 17 connect the signaller to the telephone 18.

The signaller 12 receives all incoming calls on the service channel without giving them any continuation. However, when an incoming call is intended for the station in question, the decoder 16 operates and delivers a signal, at its output 19, to the input 35 of a G gating device 36. The output 37 of this device then applies a signal to the input 8 of the timing generator 7. The counter 4 leaves the service channel and passes from one channel to another. When the transmitter-receiver 1 reaches the channel which carries the marking G, the filter 34 receives the tone G and sends it to the signaller 12 by its output 38 at the same time that it locks the gating device 36 by its output 39. The device 36 suppresses the signal on its output 37. The timing generator 7 is stopped and leaves the counter 4 and the transmitter receiver 1 on the channel marked G.

In response to the application of the tone G on the connection 38, the signaller 12 ought to send a signal to the fixed station. As the same channel G can be taken by another mobile station for an outgoing call, this signal is here no longer a simple acknowledgement of receipt, but a seizure signal (tone $T_1$, then tone $T_2$, then again tone $T_1$). In response to the first part of this signal, the fixed station stops the marking G on the channel considered (it will place it on another channel that the turning priority device will designate to that end). When the signaller 12 notes the stoppage of the tone G at this moment, it will wish to state that it is indeed the mobile station considered that has seized the channel G. The signaller ends

| Programme of the fixed station | | Programme of the mobile station |
|---|---|---|
| **Terminating communications** | | |
| No. called on service channel | → | |
| | | Decoding of selective call<br>Search for the channel "G"<br>End of search |
| | ← | Seizure signal $T_1/T_2/T_1$ |
| Stopping of the marking "G"<br>(Marking "G" on another channel) | → | |
| Connection<br>Ringing | → | Continuation of the programme |
| | | Ringing<br>Lifting of handset |
| Connection | ← | Signal $T_2$ |
| . . . . . . . . . . . . . . . . . . . . . . . . | | Hanging up handest |
| Release | ← | Signal $T_3$<br>Homing to the service channel. |
| **Originating communications** | | |
| | | Lifting of handset<br>Search for channel "G"<br>End of search |
| | ← | Seizure signal $T_1/T_2/T_1$ |
| Stopping of the marking "G"<br>(Marking "G" on another channel) | → | |
| | ← | Identity code on $T_1/T_2$ |
| Return of the identity code | → | |
| | ← | Acknowledgement of receipt $T_1$ |
| Switching<br>Dialling tone | → | |
| | ← | Wanted No. on $T_1/T_2$ |
| Switching<br>Connection and metering | | . . . . . . . . . . . . . . . . . . . . . . . . |
| . . . . . . . . . . . . . . . . . . . . . . . . | | Hanging up handset. |
| Release | ← | Signal $T_3$<br>Homing to the service channel |

the seizure signal and puts itself in a condition of waiting for the continuation of the program. The exchange proceeds to the connection and sends the ringing signal. The signaller 12 receives this signal and sends it to the telephone 18, which rings or makes a visible signal operate. The user lifts up his handset. The following operation, here comprising the return to the service channel after hanging up, is the same as in the system of FIG. 4.

In an outgoing call the operation is the same as in the system of FIG. 4, with however the difference that the signal of lifting the handset on the output 27 of the signaller 12 is again applied to the input 35 of the same G gating device 36 instead of being applied to another gating device.

While the principles of the invention have been described above in connection with specific apparatus and applications, it is to be understood that this description is made only by way of example and not as a limitation on the scope of the invention.

I claim:

1. A system for providing a radio link between a fixed radio station associated with a telephone exchange and a plurality of mobile radio stations, wherein the improvement comprises:
- a fixed radio station capable of transmitting on a plurality of radio channels,
- a telephone receiver at each of a first group of selected mobile radio stations,
- a paging system at each of a second group of selected mobile radio stations,
- each mobile radio station being tuned to receive terminating calls over a fixed service radio channel,
- said fixed station providing a distinctive marking to one of said plurality of radio channels to designate an available free channel,
- said free channel serving as the signalling channel for the telephone equipped mobile radio stations when an originating call is made from one of them, and
- said free channel serving for the continuation of signalling and conversation in both originating and terminating calls to telephone equipped mobile radio stations.

2. A system according to claim 1, in which:
- an "originating" marking is constantly applied to mark the free channel as available for seizure by an originating call placed from a mobile station, and
- a "terminating" marking is applied to another free channel for the seizure of this channel by a mobile set in response to an incoming call.

3. A system according to claim 1, in which another free channel is selected, busied and marked "terminating" by the fixed station only upon the sending of a selective call directed to a mobile set.

4. A system according to claim 1, in which said marking signal is constantly applied to the free channel to indicate the availability of the channel for seizure by the mobile unit.

5. A system according to claim 1, in which the fixed service channel is kept free of a marking signal.

6. A radiotelephone exchange as claimed in claim 1, including registers to analyze wanted numbers in terminating calls, and to control the sending of selective calls towards mobile apparatus, radiotelephone sets and warners, on a fixed service channel.

7. An exchange, according to claim 6, including means which allow the registers, which are located in the telephone exchange, to control the sending of selective calls towards warners without controlling switching in the associated fixed radio station which is coupled to said telephone exchange and to release the calling connection immediately after this sending.

8. An exchange according to claim 6, including turning priority means for selecting the channels to be marked.

9. A mobile radiotelephone station according to claim 1, comprising means to return to a condition of readiness on a fixed service channel after a communication, and means for searching for a marked channel.

10. A mobile set according to claim 9, including a signaller allowing exchanges of signals and programmed operations.